Dec. 5, 1944.     O. O. KRUSE     2,364,080
DRYING OVEN
Filed July 6, 1942     11 Sheets-Sheet 1

INVENTOR.
Orlin O. Kruse
BY Ivan D. Thornburgh
Charles H. Erne
ATTORNEYS

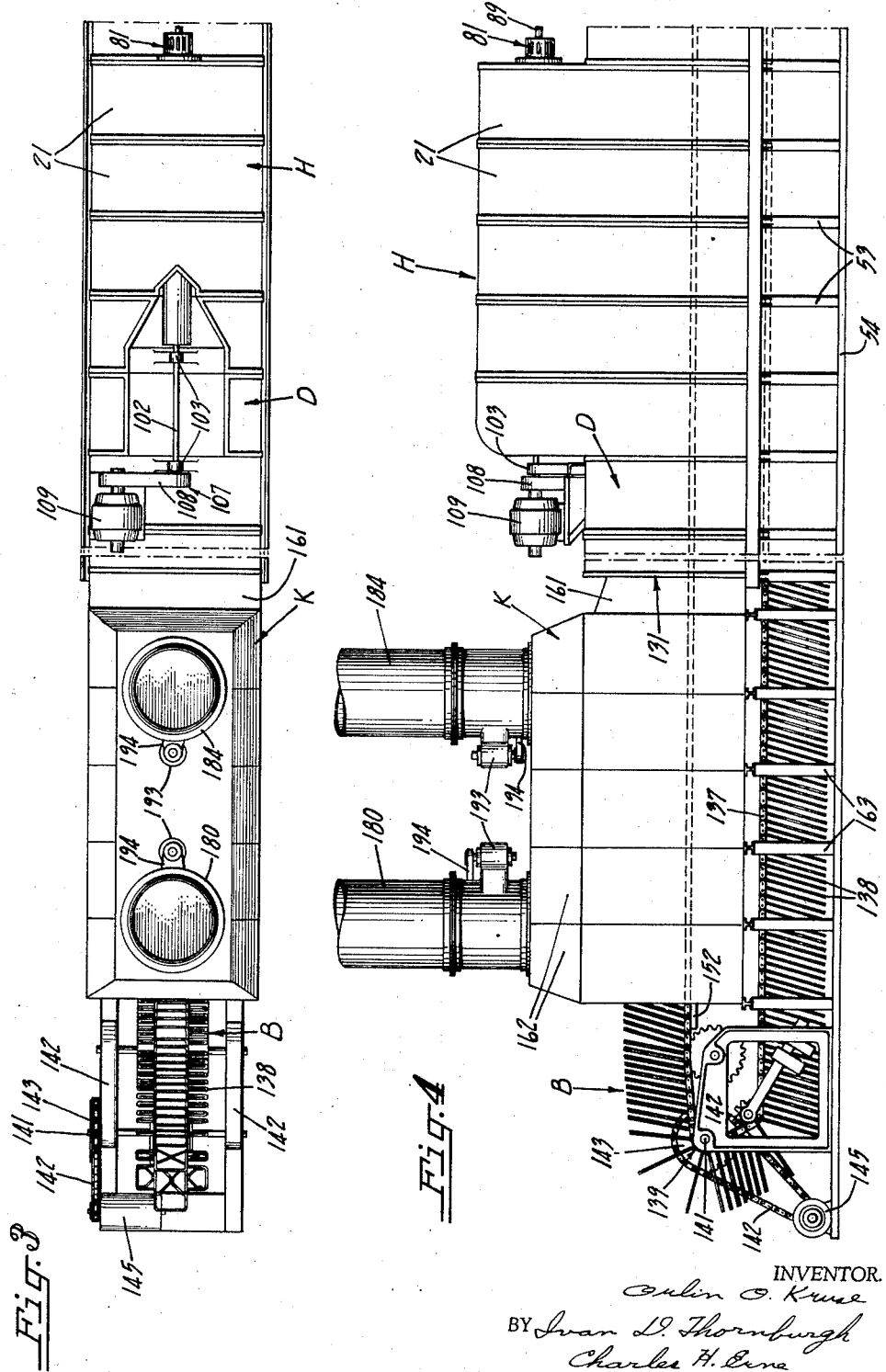

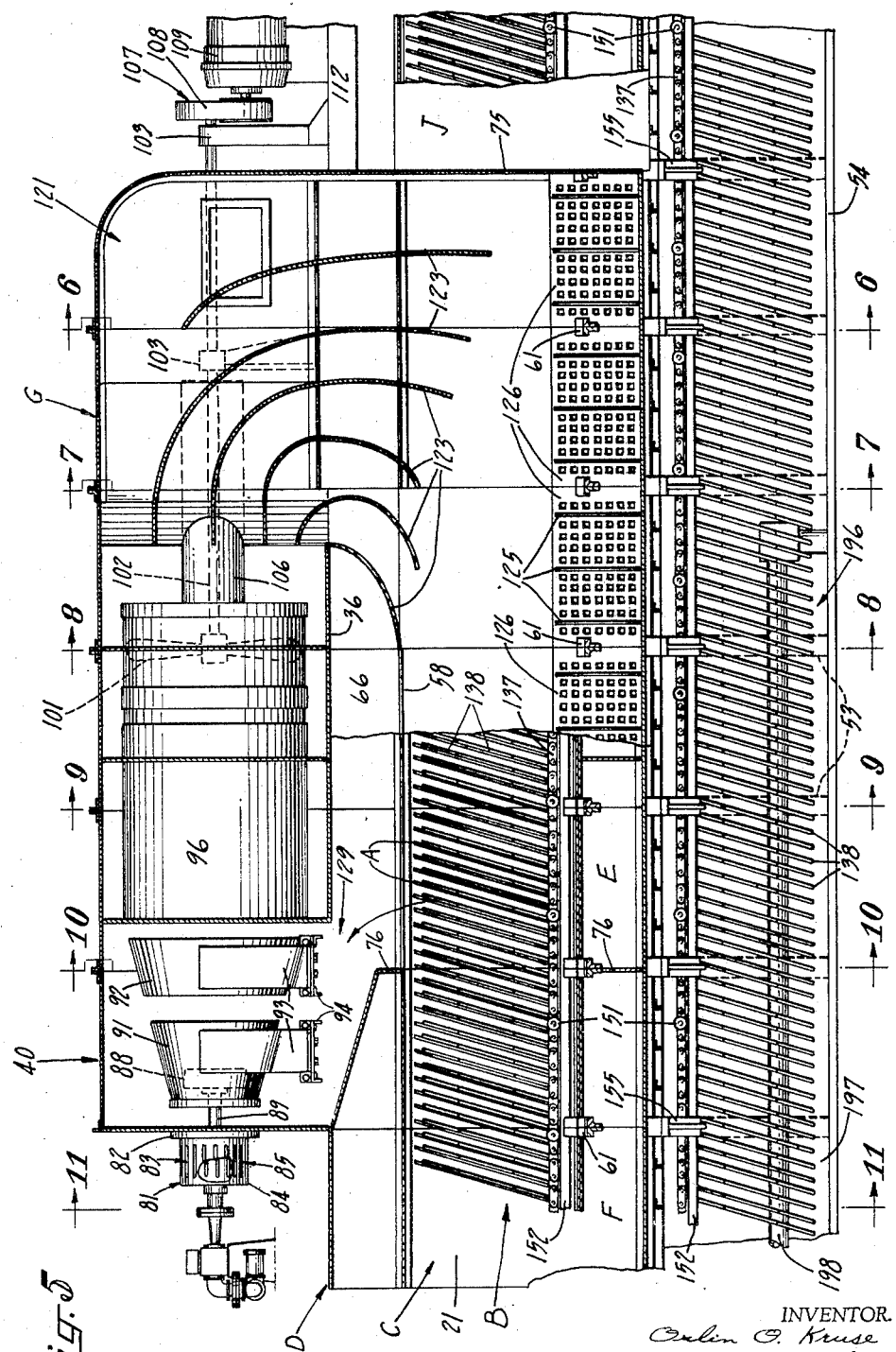

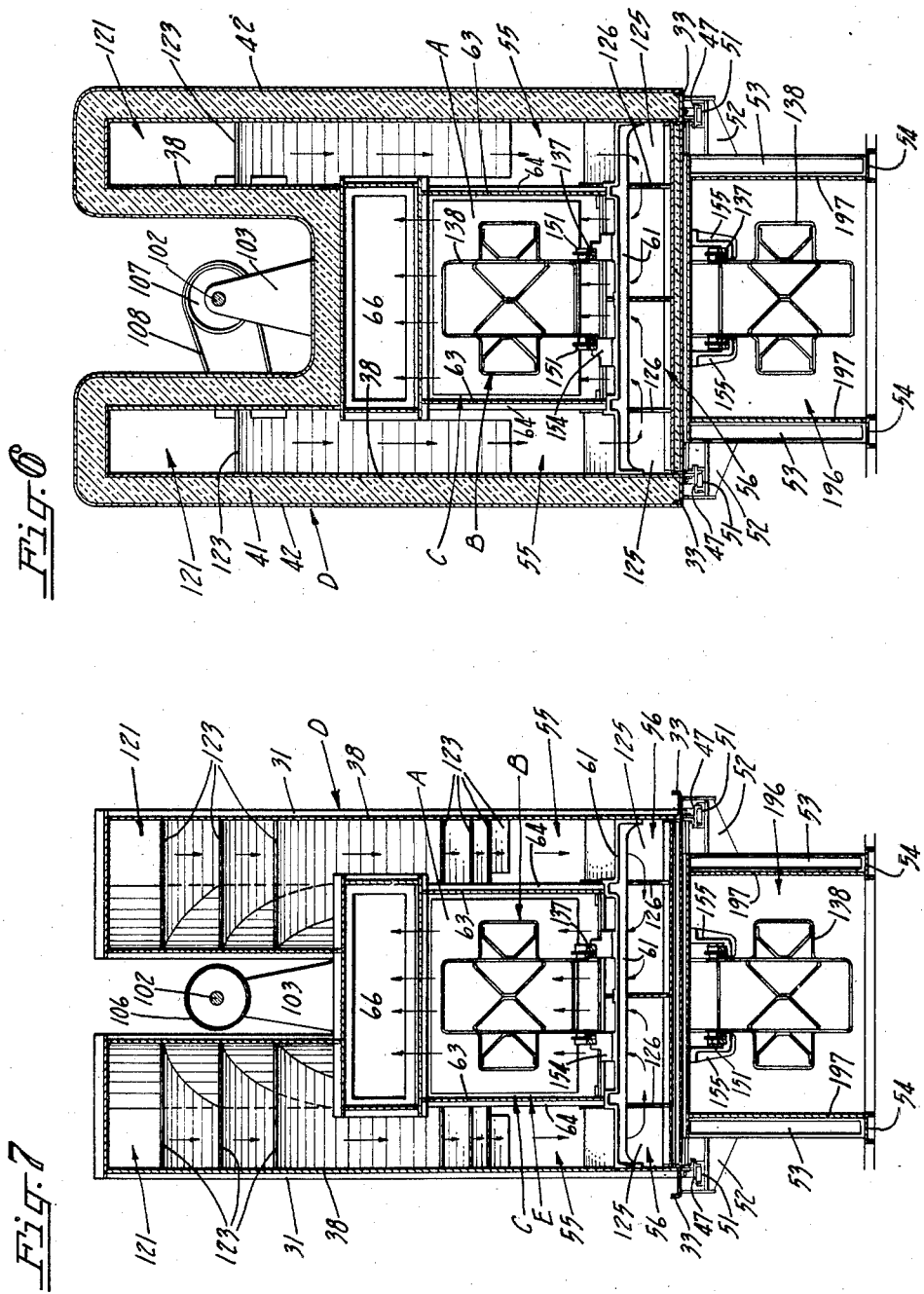

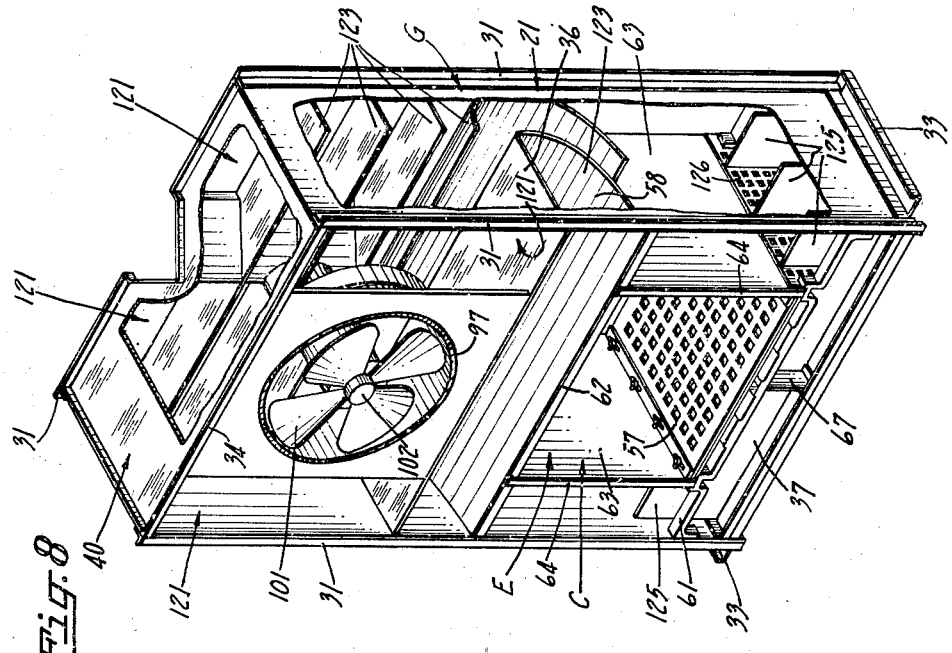
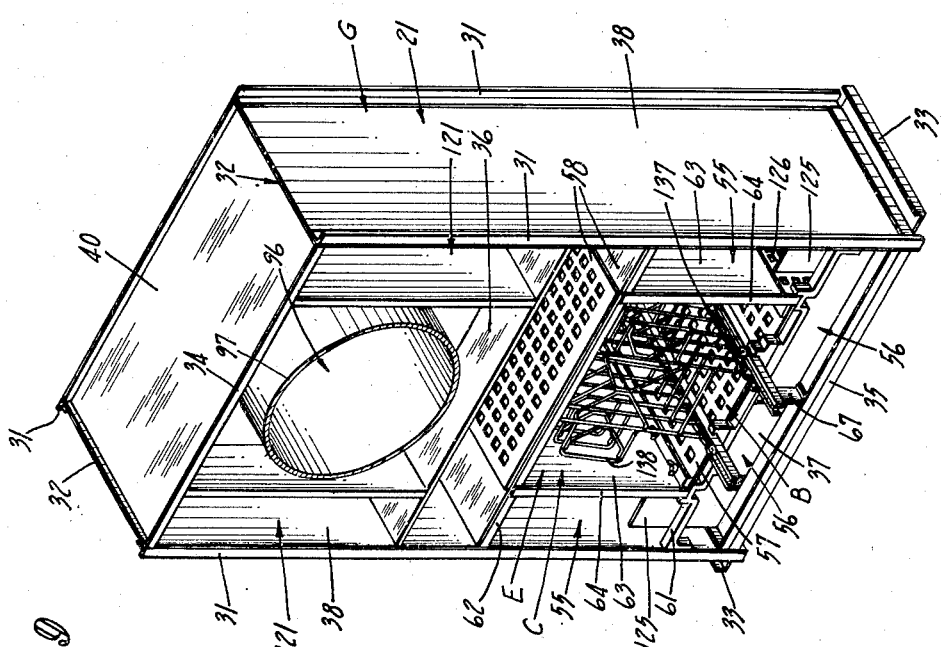

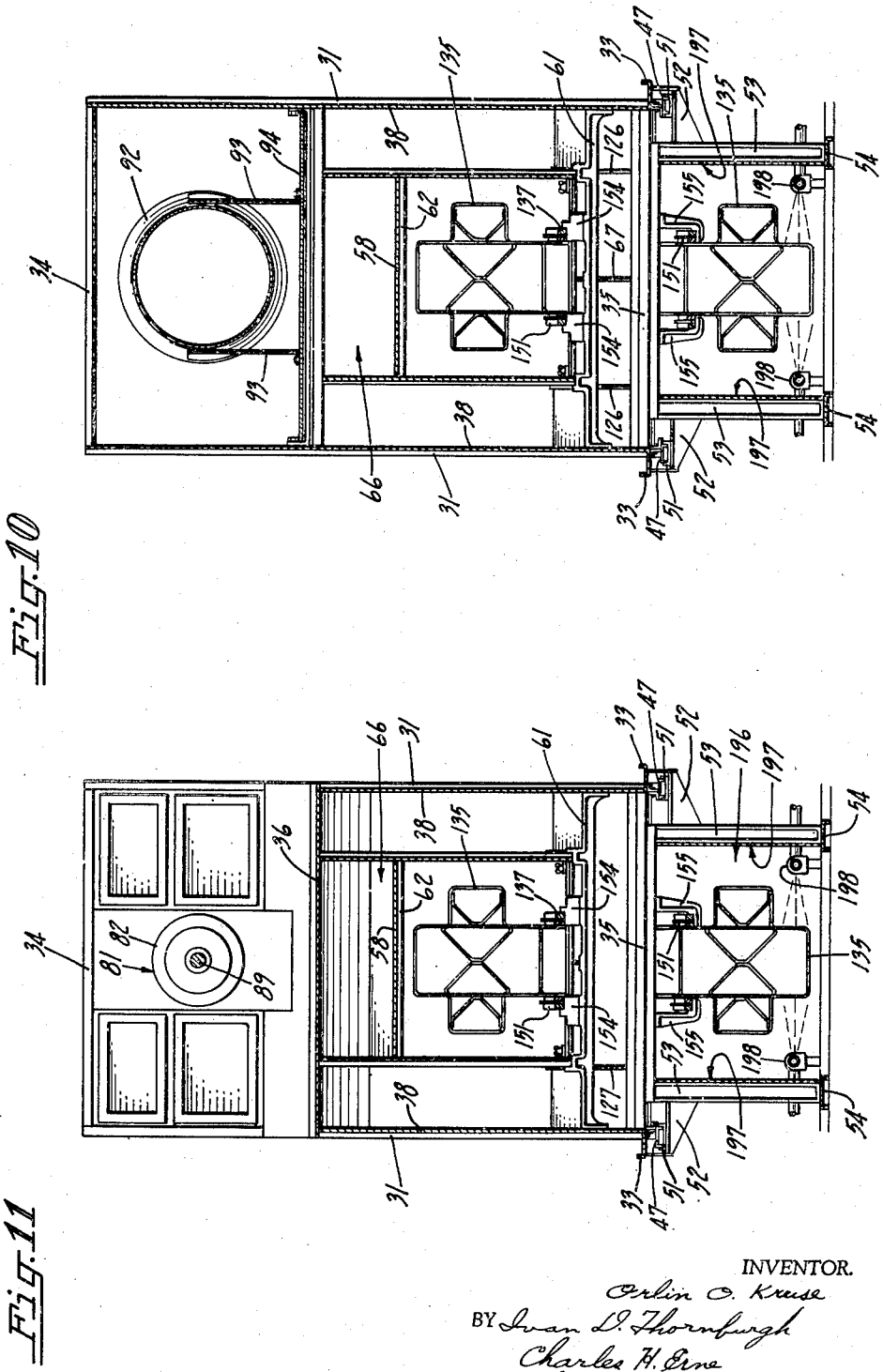

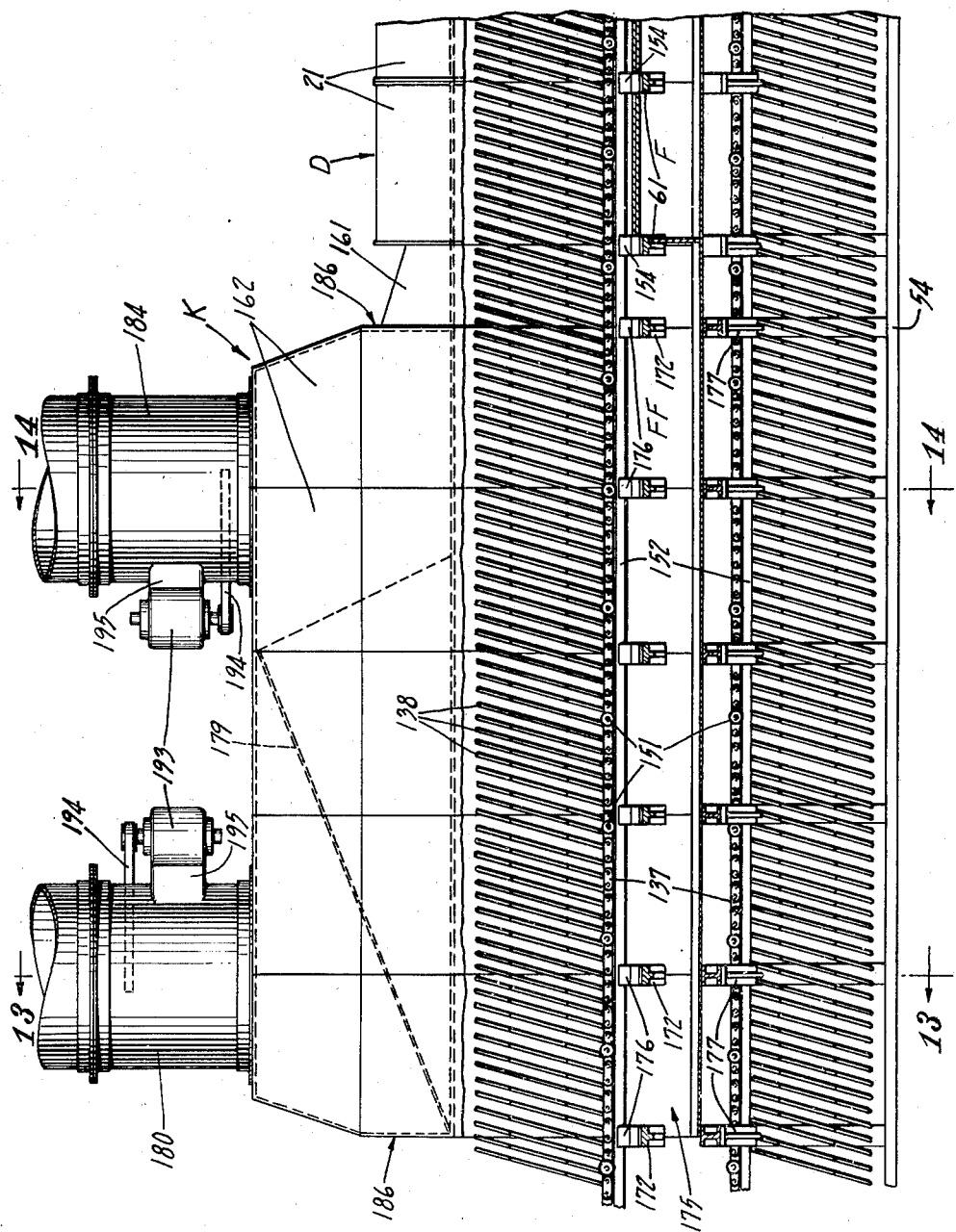

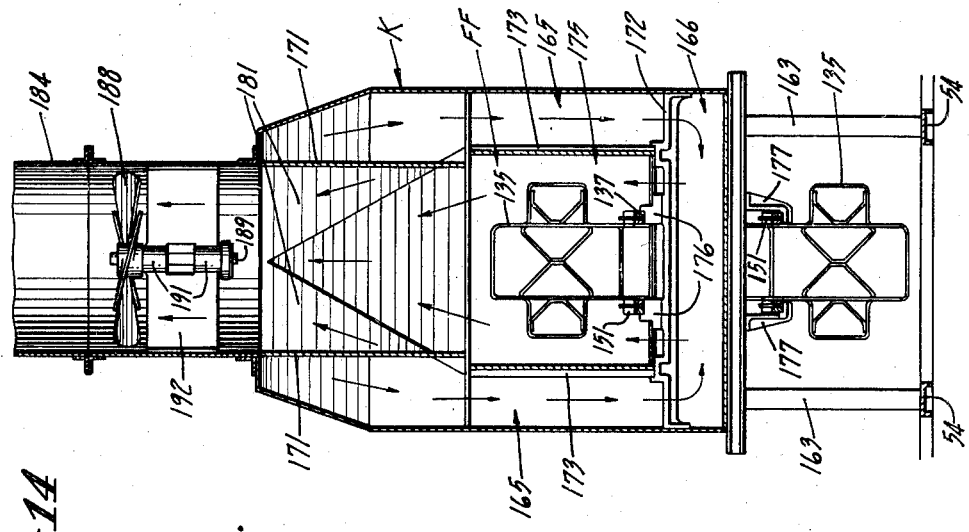
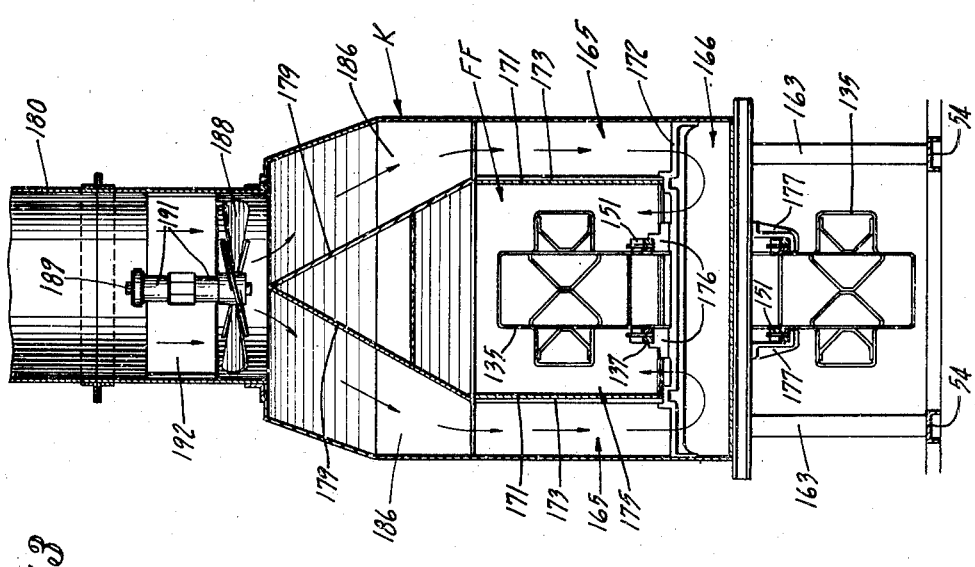

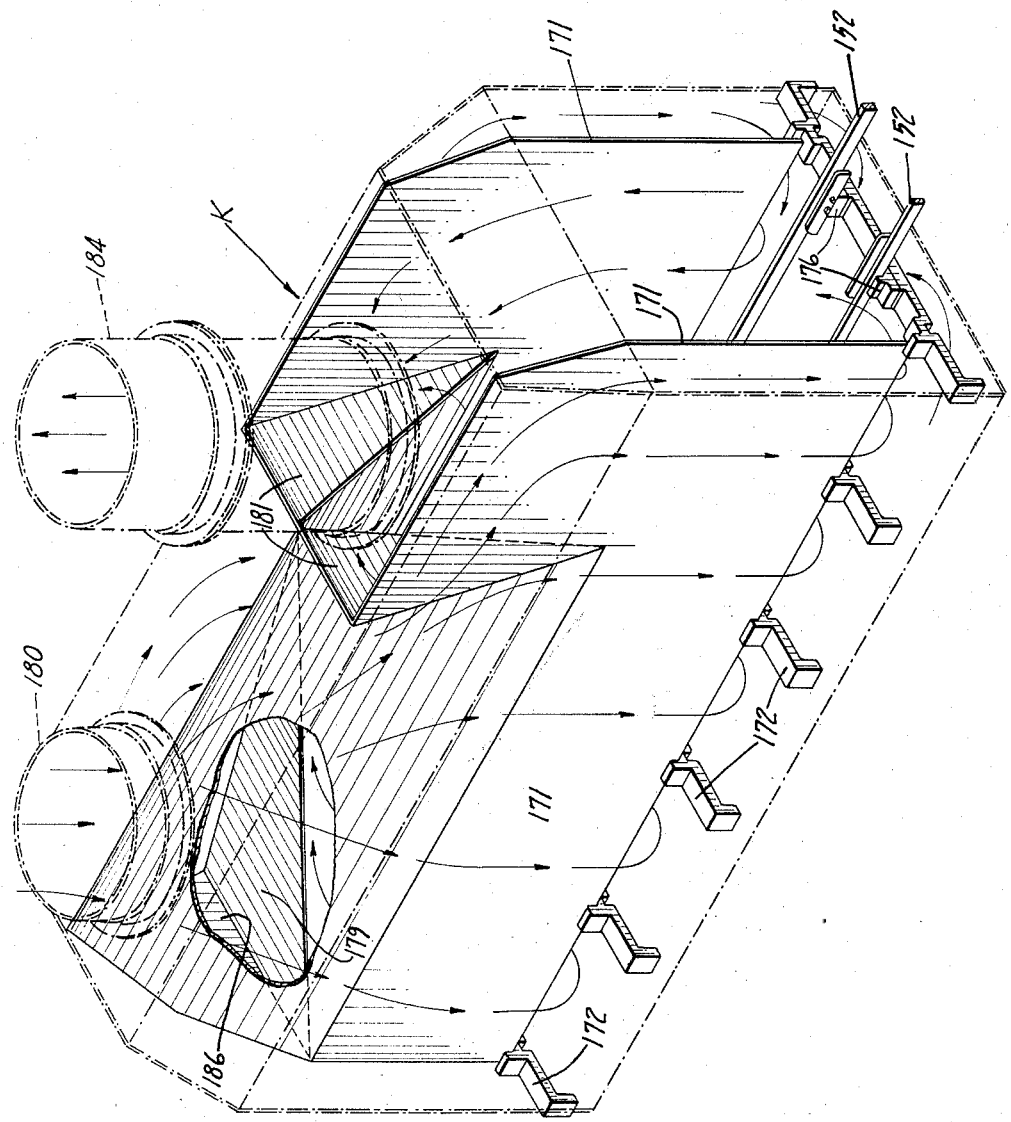

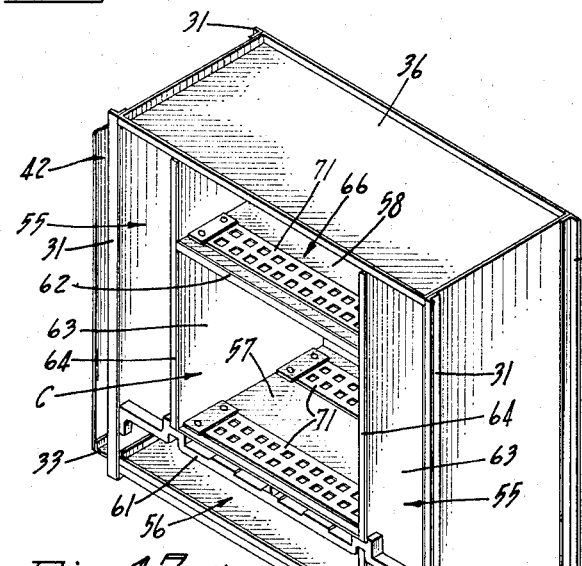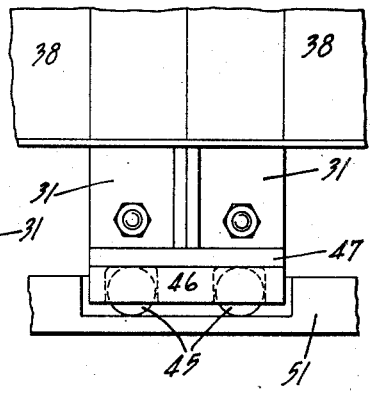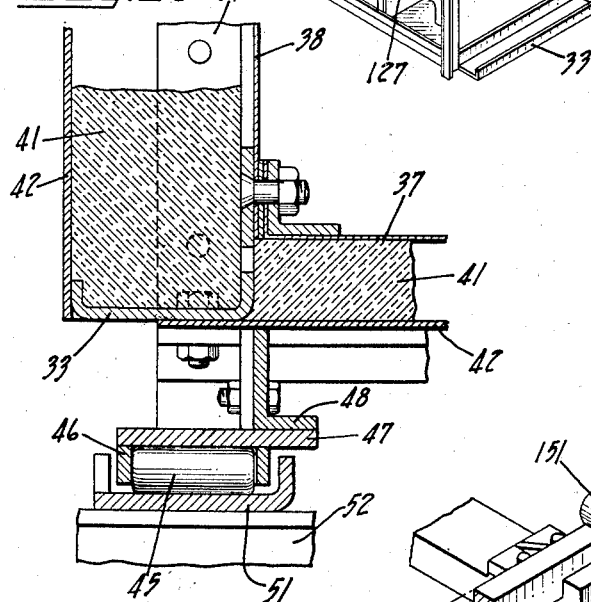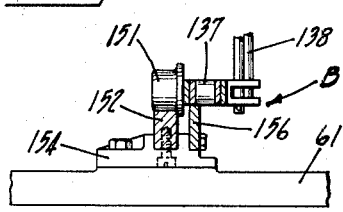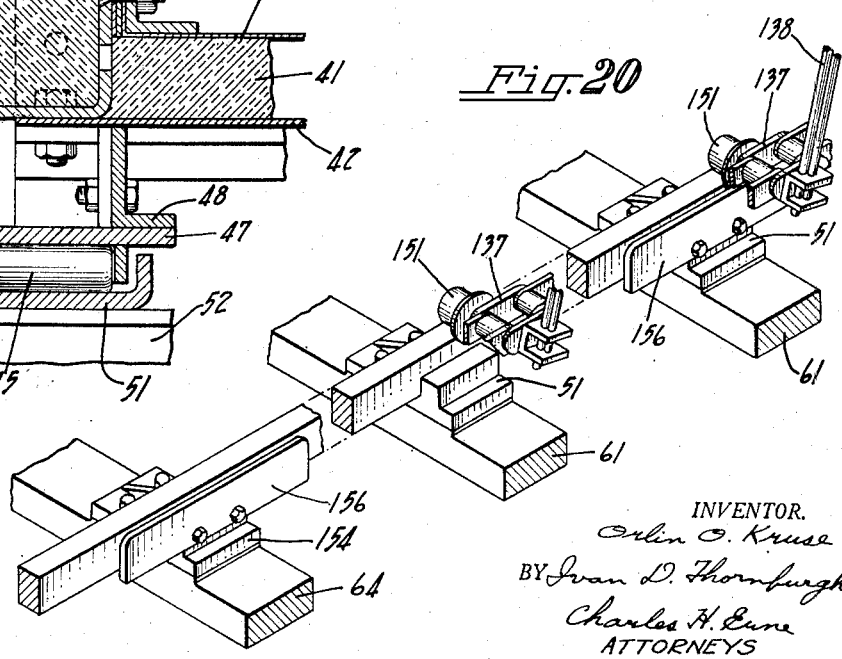

Dec. 5, 1944.   O. O. KRUSE   2,364,080
DRYING OVEN
Filed July 6, 1942   11 Sheets-Sheet 11

INVENTOR.
Orlin O. Kruse
BY Ivan D. Thornburgh
Charles H. Erne
ATTORNEYS

Patented Dec. 5, 1944

2,364,080

UNITED STATES PATENT OFFICE 2,364,080

DRYING OVEN

Orlin O. Kruse, Oak Park, Ill., assignor to American Can Company, New York, N. Y., a corporation of New Jersey Application July 6, 1942, Serial No. 449,940

10 Claims. (Cl. 34—150)

The present invention relates to ovens for drying coated or lithographed sheets or the like and has particular reference to bringing the sheets to a baking temperature rapidly and to distributing the heating medium over the individual coated sheets uniformly, so that an improved quality of product will result.

In the manufacture of sheet metal containers or cans the lithographing or coating on the exterior and interior surfaces of can parts is usually applied to the sheet material while it is in the flat and these sheets after being dried in baking ovens are subsequently cut across or die punched to produce can bodies, can ends, and other can parts. With the advancement in the art of making such coated containers it is sometimes desirable to use sheets of larger dimensions than those used heretofore. It has been found that these larger sheets and the higher speeds at which it is desired to dry them, materially complicate the sheet baking problem.

The instant invention contemplates solving this baking problem by providing an oven in which the coated sheets are initially and uniformly heated to a baking temperature in as short a time as possible and then maintaining the baking temperature for the full period required to thoroughly dry and bake the coating so that the resultant product will be of high quality.

An object, therefore, of the invention is the provision of a sheet drying oven wherein the sheets to be dried are heated to a predetermined baking temperature in a very short time and this baking temperature is maintained for a predetermined period to properly bake the coating on the sheets.

Another object is the provision of such a drying oven wherein the baking process is effected by heated air which is passed upwardly in predetermined volumes and at determined velocities flowing between the sheets as they move through the oven in an "on-edge" position, the spacing of the sheets being uniform so as to distribute the heat evenly over both surfaces of the sheets.

Another object is the provision of an oven of this character wherein the heated air used for heating the sheets and for baking the coating is mixed thoroughly prior to distribution through the oven so that stratification and heat variation are reduced to a negligible minimum.

Another object is the provision of such an oven having a sectional construction wherein certain air entrances on opposite sides of alternate sections are blocked off in a staggered relation so that a more complete circulation of the air through the oven may be obtained.

Another object is the provision of such an oven wherein the sheets to be dried are preheated in a heating compartment and then passed on to a drying compartment where the surface coating on the heated sheets is baked, each of these compartments having a separate source of air and a separate heating and circulating means.

Another object is the provision of such an oven wherein heated air from one compartment flows into the other compartment and forms a stop curtain which prevents fumes and vapors, rising from the surface coating on the sheets, from circulating through the oven.

Numerous other objects and advantages of the invention will be apparent as it is better understood from the following description, which, taken in connection with the accompanying drawings, discloses a preferred embodiment thereof.

Referring to the drawings:

Fig. 3 is a top plan view of the discharge end of the oven shown in Fig. 1 and continuing from the left in such figure, Figs. 1 and 3 when joined showing outstanding features of the complete oven with a large part of the central oven sections broken away;

Fig. 4 is a side elevation of the portion of the oven shown in Fig. 3, with parts broken away;

Fig. 5 is an enlarged longitudinal section taken substantially along the broken line 5—5 in Fig. 1, with parts broken away;

Figure 2:
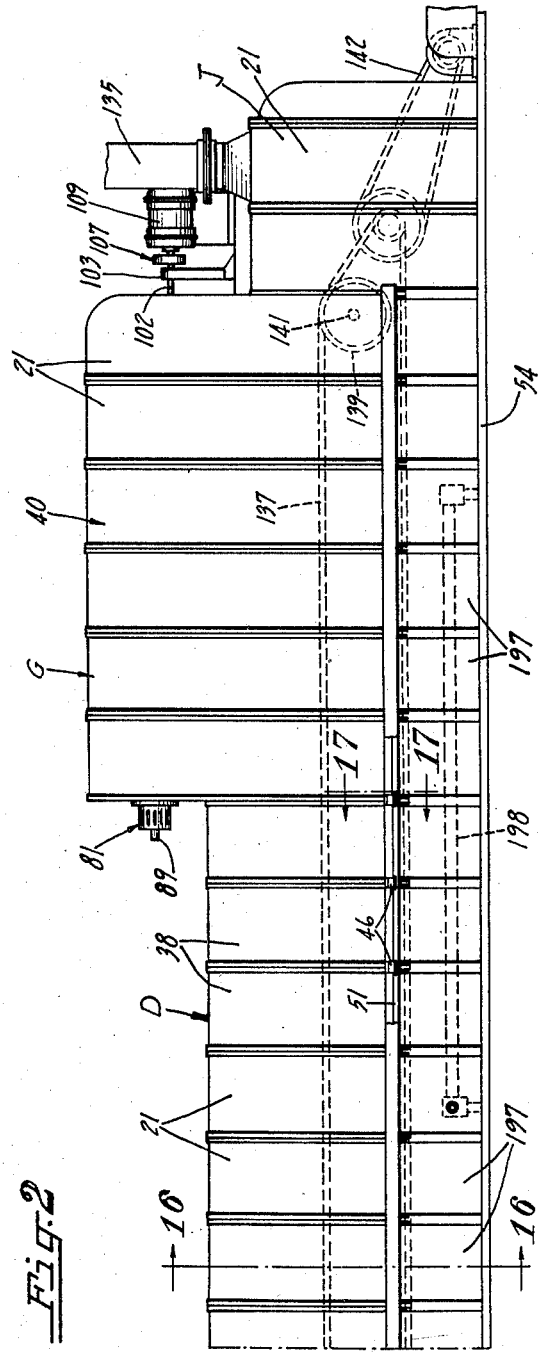
Fig. 2 is a side elevation of the portion of the apparatus shown in Fig. 1, with parts broken away.
Figure 21:
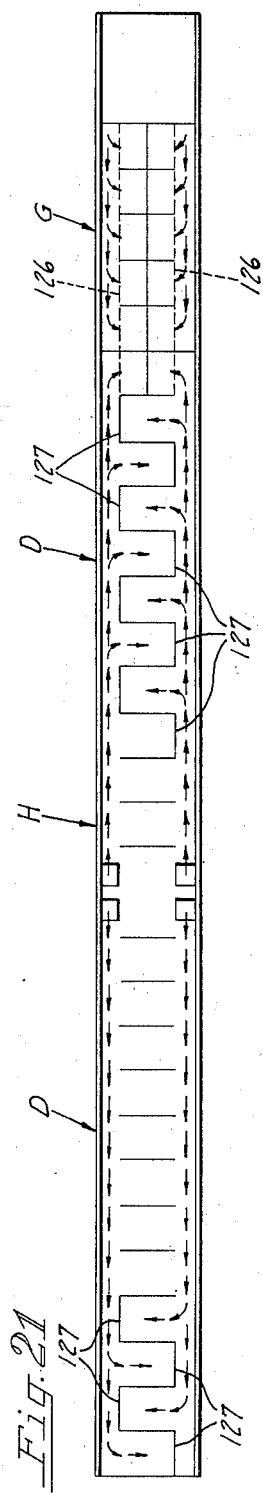
Figure 22:
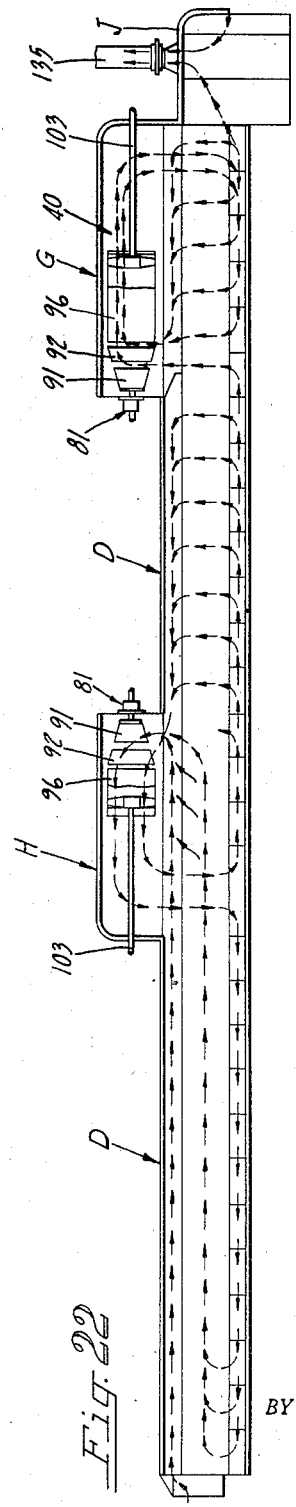

Figs. 6 and 7 are transverse sectional views of individual sections of the oven, taken substantially along the respective lines 6—6 and 7—7 in Fig. 5;

Figs. 8 and 9 are perspective views drawn to an enlarged scale but at the front each view shows a section of the oven similar to Figs. 6 and 7, such views being taken along section lines 8—8 and 9—9 in Fig. 5, with the lower portion of the oven omitted and parts being broken away;

Figs. 10 and 11 are sectional views taken along the section lines 10—10 and 11—11 in Fig. 5;

Fig. 12 is an enlarged view of the cooling section of the oven, with parts broken away;

Figs. 13 and 14 are transverse sectional views taken substantially along the respective lines 13—13, 14—14 in Fig. 12;

Fig. 15 is a perspective view of the air deflecting walls located inside the cooling sections of the oven shown in Figs. 13 and 14, the view also showing other parts of these sections in dot and dash lines;

Fig. 16 is a perspective view similar to Figs. 8 and 9, the view showing a typical oven section in the region indicated by the line 16—16 in Fig. 2;

Fig. 17 is an enlarged sectional detail taken substantially along the line 17—17 in Fig. 2, with parts broken away;

Fig. 18 is a fragmentary side elevation of the detail shown in Fig. 17;

Fig. 19 is an enlarged sectional detail of the conveyor chain and its track, with parts broken away;

Fig. 20 is a perspective view of the conveyor track and guard rails, with parts broken away and with portions of the chain in place on the rails; and Figs. 21 and 22 are schematic top and side views of the oven, the views showing by way of arrows the circulation of the heated air through the oven chamber and compartments.

As a preferred embodiment of the instant invention the drawings illustrate a drying oven of the character disclosed in United States Patent 1,591,683, issued July 6, 1926, to C. G. Preis. In such an oven freshly coated or lithographed sheets A (Figs. 5, 6 and 7) of tin plate or the like material are received on a conveyor B (see also Fig. 4) from any suitable source of supply such as a coating or printing machine and are carried in an upright "on-edge" position through the oven for drying.

In the oven shown in the instant drawings, the conveyor B carries the sheets through a long chamber C which is enclosed by a casing D. This chamber may be considered to be divided broadly into three connecting compartments through which the sheets pass in succession. The first chamber division is a short heating compartment E (Fig. 5) at the front or entrance end of the machine. The major remaining part of chamber C is a baking compartment F. At the exit end of the oven, chamber C includes a cooling compartment FF (Fig. 12).

Each compartment E and F is heated independently. A hot air circulating unit G heats and circulates air for the front compartment, this air moving between the cold sheets coming into the oven. A second hot air circulating unit H of the same construction as the unit G, heats the compartent F. Unit H (Figs. 3 and 4) is located near the middle of the oven. It should be understood that there is considerable distance between the heating unit H and the cooling end of the oven, but this is not apparent from the drawings (Figs. 3 and 4) inasmuch as most of the oven sections in that region are not shown.

Figure 1:
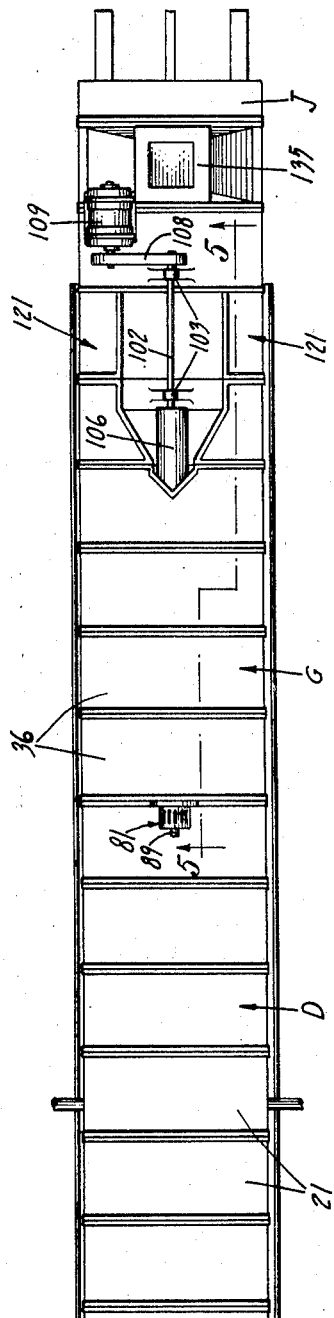
Figure 1 is a top plan view of the entrance end of an oven embodying the instant invention, with parts broken away.

The sheets A to be dried enter the oven from the right (as viewed in Figs. 1 and 2) such sheets being brought in through a front canopy section J in any suitable manner as by an inclined feed belt. This canopy section collects and removes some of the fumes from the freshly coated sheets. From the canopy section, the sheets move directly into the front heating compartment E (Fig. 5). In this front compartment the incoming sheets are heated thoroughly and their temperature is raised to a predetermined baking temperature which is dictated by the particular kind of coating or lithographing upon the sheets.

It has been found that the drying of the coating on the sheets results in an improved quality of product if the sheet is thoroughly heated through before the baking of the coating begins. In the present invention, it is in this chamber that the sheets are pre-heated. This pre-heating is effected as rapidly as possible so that the temperature of the sheet will be raised before its coating begins to dry. It is for this purpose that the pre-heating compartment is made relatively short in its longitudinal dimension.

The pre-heated sheets upon leaving the front compartment E enter and travel through the long baking compartment F. In this baking compartment, the temperature is maintained throughout its entire length at a uniform predetermined degree that will dry and bake properly the coating on the sheets. This baking temperature is maintained constant within predetermined limits which prevents burning of the coating.

After this baking process, the conveyor carries the hot sheets through the cooling chamber section FF which is enclosed in a cooling casing K and where the temperature of the sheets is reduced sufficiently to permit of handling. The cooled sheets are discharged at the end of the conveyor to any suitable place of deposit. This discharge of the sheets may be effected by removing them manually from the conveyor or by automatic discharge mechanism connecting with the conveyor.

The casing D in the embodiment herein illustrated is built preferably of thirty-three sheet metal transverse sections 21 exclusive of the cooling casing. Sections 21 abut against each other in endwise relation and are bolted together to constitute one long unitary structure. These sections are similar in general construction but differ in internal arrangement.

At the front end of the oven, the canopy J (Fig. 2) utilizes three sections 21. Six taller sections are used adjacent the front to enclose the compartment E and the unit G although one section is used in part only for this purpose. Five taller sections go to make up the enclosure for the heating unit H and the remaining nineteen sections enclose the compartment F. Twelve sections (broken away in Figs. 3 and 4) are located between the heating unit H and the cooling casing K.

Each section 21 is rectangular in shape and is formed with a structural steel frame. The frame includes four vertical angle iron corner posts 31 (Figs. 9 and 17) which are tied together by upper longitudinal angle irons 32, lower longitudinal channel irons 33, and upper and lower crossbeams 34, 35, respectively. The top, bottom and sides are covered with sheet metal plates 36, 37, 38 secured to the inside of the frame. The corner posts of adjacent sections are bolted together to unite them into one casing. Gaskets between the corner posts provide a leak-proof joint. Members of the circulating sections G extend above the regular sections 21 and these upper portions constitute housings 40 which are occupied by parts of the circulating system to be hereinafter explained.

The entire outside surface of these oven sections is covered with an insulating material 41. This material is held in place by an outer metallic shell 42 which is secured to the frame members of the oven sections. To simplify the disclosure, only Figs. 6 and 17 show such insulation and it may be assumed that the insulation has been removed in the other figures.

In such a long oven considerable elongation takes place due to expansion of the sections when the oven is operating under high temperature conditions. To compensate for this expansion, the oven sections are mounted on rollers 45 (Figs. 2, 17 and 18). These rollers are confined loosely in slotted retainer shoes 46 mounted on and depending from horizontal plates 47. These plates are secured by angle iron brackets 48 to the lower ends of each pair of contiguous corner posts 31 of each two adjacent section frame members. Each oven section therefore is supported on the rollers of four shoes but each shoe also further supports other adjacent sections.

The rollers 45 operate on a pair of horizontal channel iron guide rails 51 that extend longitudinally of the oven casing D for its entire length. The middle section of the casing is bolted to the rail. Hence the middle section remains stationary while the other sections are free to expand in opposite directions from the middle section and are prevented thereby from buckling. The channel iron rails maintain the oven sections in longitudinal alignment and prevent lateral displacement.

The channel rails 51 are bolted to brackets 52 (Figs. 10 and 11) which project outwardly from the sides of transverse leg sections 53 that rest upon a pair of longitudinal base plates 54. The brackets and the leg sections constitute the main frame of the oven.

The interior of each oven section 21 is formed with heating channels or spaces 55, 56 (Figs. 7, 9 and 16) for the circulation of the heating medium through the oven chamber C. These heating channels are set off by horizontal floor and ceiling plates 57, 58 which are secured to crossbeams 61, 62 and by side plates 63 which are bolted to upright supports 64 fastened to the crossbeams. These plates are all spaced inwardly from the frame plates to provide the spaces 55, 56 between them. It is these plates that enclose the heating chamber C.

The ceiling plate 58 sets off a return passageway or channel 66 (see also Figs. 10, 11 and 16) located above the chamber C while a division plate 67 located in the middle of the bottom channel 56 extends longitudinally of the oven casing for nearly its full length and divides the bottom channel into two separate channels. In the eleven sections of the oven that constitute the circulating sections G and H the floor and ceiling plates 57, 58 are perforated, as best shown in Fig. 9, while the same plates in the other sections (as shown in Fig. 16) merely have perforated portions which are covered by adjustable perforated members 71 that are slidable along the floor and ceiling plates to regulate the size of the openings in the plates.

With this construction of oven section, the heating medium when introduced into the side channels 55 travels downwardly into the bottom channels 56 and thence upwardly through the perforations in the floor plate 57. The heating medium thus introduced into the heating chamber C passes up between the sheets which are moving through the chamber on the conveyor B. Such medium then passes up into the outlet passageway 66 through the perforations in the ceiling plate 62 and slide members 71. It is this circulation of the heating medium passing up from the bottom of the sheets where they are uniformly spaced apart and escaping at the top that more effectively first heats the sheets and then dries and bakes the coating thereon.

The ends of the heating channels 55, 56 in compartment E are blocked off by an outer transverse end wall 75 (Fig. 5) and an inner transverse end wall 76. It will be observed that end wall 76 is spaced inside the sections enclosing the unit G the width of one section as previously intimated. These end walls 75, 76 are formed with openings just large enough to permit the passage of the sheets therethrough. The heating medium introduced into the chamber E by the front circulating section G is confined by these end walls.

Air for circulating through the heating channels 55, 56 and the chamber C is drawn into the circulating sections G by way of a rotor valve 81 which is located outside the oven and at one end of the taller sections forming this group of housing units. This rotor valve is a hollow cylinder having a flange 82 which is bolted to the end wall of the inner section G. An opening in the wall communicates with the interior of the cylinder. The cylinder is formed with longitudinal slots 83 which admit air into the circulating sections. A rotatable cover member 84 surrounds the cylinder and is formed with cooperating slots 85. By rotating the cover the size of the slot openings may be adjusted to control the amount of air admitted into the sections.

Air drawn into the housing at this point is heated immediately by a burner 88 which is located in line with the rotor valve 81 and is disposed just inside the housing. This burner is supplied with gas by way of a pipe line 89 that extends through the middle of the rotor valve and leads from any suitable supply of gas. The burner is surrounded by a frusto-conical shaped deflector 91 which shields the incoming air from the heat of the burner and which directs the heated air horizontally through the housing.

A second or auxiliary deflector 92 of larger diameter and of the same conical shape is disposed in front of the first deflector in spaced relation thereto and continues the direction of movement of the heated air. These deflectors are mounted on brackets 93 carried on crossbeams 94 the ends of which are secured to the side plates 38 of the circulating unit G (see Fig. 10).

The heated air on leaving these deflectors 91, 92 is directed into a mixing chamber 96 located within a hollow mixing cylinder 97 disposed within the housing sections and located in horizontal alignment with the burner 88 (see Figs. 8 and 9). This cylinder surrounds a mixing and circulating fan 101 which is mounted on a horizontal drive shaft 102, journaled in a plurality of spaced bearing brackets 103 secured in the housing of the circulating section G. The shaft extends outwardly through a cooling tube 106 that projects out through the outer end wall of the housing. Outside the housing the fan shaft 102 carries a pulley 107 which is driven by a belt 108 operating from an electric motor 109. The motor is mounted on a bracket 112 secured to the outer end wall 75 of the circulating section G.

The fan rotates at high speed within the mixing cylinder 96 and thus thoroughly mixes the heated air so that stratification is eliminated. The fan also draws the air past the burner and into the mixing chamber and further circulates the heated and mixed air through the heating channels 55, 56 hereinbefore mentioned. The speed of the fan is controlled by the motor 109 which may be set to produce a predetermined velocity of air travel through the circulating section. The motor 109 and fan 101 are duplicated for the other circulating section H but the velocity of the air travelling through the two sections may be different if desired to produce the best results. The fan rotation in each section will determine this air velocity.

Air from the fan 101 is directed into the heating channels 55, 56 by way of two separate outer ducts 121 (Figs. 5, 6, 7 and 8) which are formed integrally with and in the upper portions of the three forward sections 21 of the circulating unit G. These ducts branch into a multiplicity of passages immediately adjacent the fan 101 and extend along the outer side walls of the sections. Such passages of these ducts communicate with the upper ends of the heating channels 55. Curved deflector plates 123 formed in the ducts provide the passages and direct the flow of heated air so that it spreads over the entire length of the circulating section or unit G.

As hereinbefore mentioned, the deflected air travels downwardly through the heating channels 55 and thence passes into the bottom heating channels 56. This circulation of the air is schematically shown in Figs. 21 and 22. Transverse vanes 125 (Figs. 5, 8 and 9) arranged in spaced relation in the channels 56 guide the heated air across the bottom of the oven in spaced lanes so that it will be uniformly delivered into and distributed through the chamber C. The air passing through these lanes is broken up by vertical perforated plates 126 to facilitate distribution therethrough. Plates 126 extend longitudinally of the circulating section G. These plates project down from the channel side plates 63 and extend into the bottom channel 56 between the vanes 125. These vanes and plates are used in the first four sections of the circulating section G.

In the seven sections 21 interposed between the circulating units G and H and in the last four sections of the oven, solid plates 127 (Figs. 11, 16 and 21) are used instead of the perforated plates 126 on opposite sides of alternate sections. These solid plates block off one channel 55 or 56 as the case may be and this provides a staggered effect which more completely circulates the heated air through the oven. In these sections the bottom channel dividing plate 67 is omitted.

From the channels 56, on each side of the dividing plate 67, the heated air rises into the heating chamber C and passes between the sheets A moving along on the conveyor B. It is this air that preheats the sheets as hereinbefore mentioned. After leaving the sheets the air which has given up some of its heat passes up into the outlet passageway 66 and flows through this passageway back to the burner 88. An opening 129 (Fig. 5) located adjacent the burner and formed in the top or ceiling plate 36 allows the used air to pass up into the region of the burner and thereby to mix with the fresh incoming air. Thus both fresh and used air are simultaneously heated and reheated. This reheated air is then mixed by the fan 101 and is recirculated through the circulating section G, as just described.

The rear circulating unit H that serves the baking compartment F is identical in general construction and operation with the front circulating section G and therefore it is thought that a detailed description of the section H need not be given. In this section H the sheets passing through are heated and therefore the air directing vanes 125 and the perforated plates 126 are not necessary and are omitted.

The outer or discharge end of the casing D is blocked off by an end wall 131 (Fig. 4) and this forms the outer barrier for the heating channels 55, 56, 66 in the baking compartment of the oven. This end wall is formed with an opening the size of the heating chamber C and permits the passage therethrough of the sheets moving through the chamber and into the cooling compartment.

The air circulated through this drying compartment F follows the general directions of the arrows shown in Figs. 21 and 22 and thereby spreads over the entire oven exclusive of the forward heating section E.

The rapid pre-heating of the coated sheets while they are in the heating compartment E tends to volatilize the solvents in the surface coating on the sheets and thus form fumes or vapors which gather in the oven chamber. These fumes are carried off by the canopy section J along with the coating fumes previously referred to.

The heated air circulating through the compartment E after passing up between the sheets is drawn back up into the stream of air entering the fan chamber as hereinbefore explained. This action is strong enough to draw in the used air from the forward end of the compartment F, as shown in Fig. 22, and the result is a rising curtain of air which tends to keep the circulating air of the heating chamber within the forward portion of the oven. This curtain of air travelling across the chamber C prevents the fumes and vapors from spreading back into the drying and baking portion or compartment F of the oven.

The canopy section J of the oven is bolted to the outer end of the front circulating section G and rests upon the base plates 54 so that it may slide with the other oven sections when they expand, as hereinbefore mentioned. This canopy section is formed with an exhaust pipe 135 (Figs. 1 and 2) which carries off the fumes of the coating from the rapidly heating sheets after they enter the oven.

The conveyor B includes a pair of spaced and parallel endless chains 137 (Figs. 5, 6 and 9) having closely spaced wickets 138 secured thereto along its entire length. This conveyor carries the sheets in the upright or "on-edge" position, heretofore mentioned. The chains operate over suitable driving sprockets 139 (Figs. 2 and 4) which are located at each end of the oven. The sprockets are mounted on drive shafts 141 journaled in bearings formed in sub-frames 142 located at each end of the oven. The sub-frame at the entrance end of the oven is disposed within the canopy section J. These drive shafts may be rotated in any suitable manner as by chains 142 shown at the discharge end of the oven (Fig. 4). The chain 142 may operate over a driving sprocket 143 mounted on the drive shaft. One or more synchronous electric motors 145, one being shown in Fig. 4, may be used to drive the chain 142.

The conveyor chains between the driving sprockets 139 are supported by flanged rollers 151 (Figs. 5 and 19) that extend outwardly from the sides of the chains at spaced intervals along their length. These rollers operate on long spaced and parallel support rails 152 (see also Fig. 20) that extend the full length of the oven. The rails along the upper run of the chains are loose being carried in grooved or slotted brackets 154 bolted to the floor beams 61 of the oven sections 21.

The rails 152 along the lower run of the chains are similarly carried in depending brackets 155 which extend down from the bottom cross-beams 35 of the oven section frames. These rails at the middle of the oven are bolted to the middle brackets thus leaving the remainder of the rails free to expand in opposite directions therefrom. This construction of rail prevents buckling and creeping of the rails in the direction of travel of the conveyor.

The chains 137 are maintained in a straight line path of travel through the oven by a plurality of safety rails 156 which are located adjacent the support rails 152. The flanges on the rollers 151 extend down between the support rails 152 and the safety rails 156, as shown in Figs. 19 and 20, and thus prevent the rollers from shifting laterally of the support rails. The safety rails are spaced at intervals along the upper and lower runs of the conveyor, preferably at alternate rail brackets 154, as shown in Fig. 20, and are bolted to the inside surface of these brackets.

The cooling section K (Figs. 3, 4, 12 and 15) of the oven is located at the discharge end of the apparatus and immediately adjacent the end of the casing D. A hood 161 fastened to the cooling section extends up to the casing D and provides an enclosed connection to protect the hot sheets as they move from the baking compartment F into the cooling section.

The cooling section K includes five sheet metal sections 162 which are similar in general construction to the oven sections 21, hereinbefore described. Sections 162 are supported on frame legs 163 (see also Figs. 13 and 14) which are secured to the base plates 54.

The interior of each cooling section 162 is formed with down draft passageways 165, which are located along the outside longitudinal walls, and a bottom passageway 166 disposed adjacent the bottom of the sections. These passageways 165, 166 are set off by inner longitudinal side walls 171 which are mounted in spaced relation to the outer walls of the sections. The side walls 171 rest on and are secured to transverse floor beams 172 and to vertical angle irons 173 which are bolted to the floor beams. The floor beams are spaced along the bottom of the sections and provide a top outlet for the bottom passageway 166. The ends of these beams are bolted to the outer walls of the cooling sections.

The side walls 171 and floor beams 172 set off the cooling chamber FF through which the sheets pass on the conveyor B. The conveyor chain guide rails 152 and safety rails 156 also extend into and through the cooling chamber and in this cooling section are carried by brackets 176 which correspond with the brackets 154 in the heating sections. The rails for the lower run of the conveyor chains in the cooling section are carried in brackets 177. Brackets 176 are mounted on the floor beams 172 and brackets 177 are bolted to the frame legs 163.

At the top, the inner or chamber walls 171 merge inwardly and upwardly into an inclined longitudinal inner roof, the ridge of which extends along the middle of the three rear cooling sections 162. The inclined walls of this inner roof, designated by the numeral 179, terminate in a peak at the top of the juncture between the third and fourth sections 162 (Fig. 12). Above this inner roof, an intake stack 180 is mounted on the cooling sections and leads fresh cool air into the housing.

Within the two inner or forward cooling sections 162 not enclosing the inner roof, the chamber side walls 171 extend straight up to the top of the housing. This brings the interior of the cooling chamber FF into communication with an exhaust stack 184 which also is mounted on the top of the cooling sections, the inner roof forming a barrier for air entering from the intake stack 180.

The edges at the open end of the roof walls 179 within the fourth section (Fig. 12) are connected with transverse walls 181 which also join with the outer casing wall. The ends of the cooling section K are closed by end walls 186 having rectangular openings therein to permit the passage of the conveyor B and its sheets therethrough. In other words, only the cooling chamber FF and not the surrounding interior space within the housing K, is open at the ends.

Each of the stacks 180, 184 house blower fans 188 (Figs. 13 and 14) which are mounted on vertical shafts 189 journaled in bearings 191 formed in brackets 192 secured inside the stacks. The fans are rotated at high speed by electric motors 193 (Fig. 12) which are operatively connected by endless belts 194 to the fans. The motors are bolted to brackets 195 secured to the outside of the stacks while the belts extend through slots formed in the sides of the stacks.

The fan 188 in the intake stack 180 forces fresh cool air downwardly through the stack and against the deflector roof walls 179. This directs the air two directions into the side down draft passageways 165 and thence into the bottom passageway 166. In this bottom passageway the currents of air meet and pass upwardly into the cooling chamber 175 and between the hot sheets moving through the chamber. It is this flow of cool air that cools the sheets.

The fan 188 in the exhaust stack 184 draws the used or spent air from the cooling chamber FF and forces it up through the stack to any suitable place of discharge. This completes the cooling action on the sheets.

After leaving the cooling section K, the cooled sheets are ready for discharge from the conveyor B. This may be done manually or automatically as hereinbefore suggested. Usually the sheets are removed manually and are arranged in stacks on hand trucks for subsequent operations.

Provision is made for pre-heating the cooled parts of the conveyor B before it again re-enters the heating chamber C of the oven. For this purpose the lower run of the conveyor B passes through a conveyor pre-heating chamber 196 (Figs. 10 and 11) which is located below the oven sections 21. This chamber is enclosed by side plates 197 that are secured to the inside surfaces of the leg sections 53 of the main frame. A pair of long tubular gas burners 198 located within the chamber and connecting with a suitable supply of gas provide heating means for raising the temperature of the conveyor to substantially that of the oven. This pre-heating of the conveyor prevents chilling of the sheets by a cold chain as they enter the oven and prevents loss of time in quickly raising the temperature of the sheets in the sheet pre-heating compartment E.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A drying oven for coated or lithographed metal sheets, comprising in combination a sectional casing enclosing a chamber, a conveyor for carrying surface coated sheets through said chamber, inner walls located within said casing in spaced relation to its outer walls and setting off vertical side passageways on each side of the chamber space through which said conveyor and its sheets travel, a heating duct connecting with said side passageways and with said chamber, means in said duct for circulating heated air through said side passageways and thence into said chamber upwardly between the sheets moving therethrough and for returning said air to said duct for re-circulation, and means for blocking off opposite sides of alternate sections of said casing for staggering the flow of heated air therethrough to produce a more complete circulation of the air.

2. A drying oven for coated or lithographed metal sheets, comprising in combination an elongated casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, and means in said duct for circulating heated air through said side and bottom passageways and thence upwardly between the sheets moving through the chamber and for returning the air to said duct by way of said ceiling passageway for re-circulation purposes.

3. A drying oven for coated or lithographed metal sheets, comprising in combination a sectional casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways and thence upwardly between the sheets moving through the chamber and for returning the air to said duct by way of said ceiling passageway for re-circulation purposes, and means for blocking off opposite sides of alternate sections of said casing for staggering the flow of heated air therethrough to produce a more complete circulation of the air.

4. A drying oven for coated or lithographed metal sheets, comprising in combination an elongated casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways, and a longitudinal partition in said bottom passageway for directing the heated air up between the sheets moving through the chamber for heating and drying said sheets and for returning the air to said duct by way of said ceiling passageway for recirculation purposes.

5. A drying oven for coated or lithographed metal sheets, comprising in combination an elongated casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways and thence upwardly between the sheets moving through the chamber and for returning the spent air to said duct by way of said ceiling passageway for re-circulation purposes, and a plurality of spaced transverse vanes in the bottom of said side passageways for preventing stratification of the heated air and for uniformly distributing the air along said bottom passageway.

6. A drying oven for coated or lithographed metal sheets, comprising in combination an elongated casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways and thence upwardly between the sheets moving through the chamber and for returning the air to said duct by way of said ceiling passageway for re-circulation purposes, and a plurality of perforated plates extending across the entrance to the bottom passageway for breaking the heated air as the air enters said passageway to facilitate distribution of the air into and through said chamber.

7. A drying oven for coated or lithographed metal sheets, comprising in combination a sectional casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways and thence upwardly between the sheets moving through the chamber and for returning the air to said duct by way of said ceiling passageway for re-circulation purposes, and a plurality of imperforate plates extending across the entrance to the bottom passageway on opposite sides of alternate sections of said casing for staggering the flow of heated air therethrough to insure more uniform and complete contact of the air with said sheets.

8. A drying oven for coated or lithographed metal sheets, comprising in combination an elongated casing enclosing a chamber, a conveyor for carrying lithographed sheets through said chamber, inner walls located within said casing in spaced relation to its outer walls and setting off side, bottom and ceiling passageways surrounding the chamber space through which said conveyor and its sheets travel, said bottom inner walls and said ceiling inner walls being perforated for the circulation of air therethrough, a heating duct connecting with said ceiling passageway and having side branches connecting with said side passageways, means in said duct for circulating heated air through said side and bottom passageways and thence upwardly between the sheets moving through the chamber and for returning the air to said duct by way of said ceiling passageway for re-circulation purposes, and a plurality of curved deflectors disposed within the side branches of said duct for guiding the heated air into said side passageways and for uniformly distributing the air throughout said passageways.

9. A drying oven for coated or lithographed metal sheets, comprising in combination an elongated casing enclosing a chamber having a heating compartment and a longer drying compartment, a conveyor for carrying lithographed sheets through said compartments, a separate duct for each compartment and in communication therewith, a heating element within each duct, a circulating fan also within each duct and disposed in axial alignment with its corresponding heating element for circulating heated air through said compartments for heating and for drying said sheets, and a cylindrical shield disposed around each fan for guiding the air into the fan to facilitate mixing of the air by the fan to prevent stratification of the air.

10. A drying oven for coated or lithographed metal sheets, comprising in combination an elongated casing enclosing a chamber having a heating compartment and a relatively longer drying compartment, a conveyor for carrying lithographed sheets through said compartments, a separate duct for each compartment and in communication therewith, a heating element within each duct, a circulating fan also within each duct and disposed in axial alignment with its heating element for circulating heated air through said compartments for heating and for drying said sheets, a cylindrical shield disposed around each fan for guiding the air into the fan to facilitate mixing of the air by the fan to prevent air stratification, a deflector disposed adjacent said heating element for directing the heated air into said shield, and a rotary valve disposed adjacent said heating element and located in a wall of said duct for admitting fresh air into said duct for heating and mixing with the air circulated through said compartments.

ORLIN O. KRUSE.